United States Patent
Kiemle et al.

[11] 3,744,878
[45] July 10, 1973

[54] LIQUID CRYSTAL MATRIX WITH CONTRAST ENHANCEMENT

[75] Inventors: Horst Kiemle; Ulrich Wolff, both of Munich, Germany

[73] Assignee: Siemens Aktiengesellschaft, Berlin and Munich, Germany

[22] Filed: Sept. 14, 1971

[21] Appl. No.: 180,407

[30] Foreign Application Priority Data
Sept. 28, 1970 Germany............... P 20 47 651.1

[52] U.S. Cl. ... 350/160 LC, 340/324 R, 350/162 SF
[51] Int. Cl. ........................................... G02f 1/28
[58] Field of Search.............. 350/160 LC, 160 R, 350/167, 3.5, 162 SF, 162 ZP, 150, 206, 320; 340/324 R, 173 LM

[56] References Cited
UNITED STATES PATENTS

| | | | |
|---|---|---|---|
| 3,499,112 | 3/1970 | Heilmeier et al. | 350/160 ZC |
| 2,696,565 | 12/1954 | Shockley | 350/206 |
| 3,580,655 | 5/1971 | Leith et al. | 350/3.5 |

OTHER PUBLICATIONS
Electronics, Vol. 43, Nov. 9, 1970, page 33.
Caulfield et al., Applied Physics Letters, Vol. 18, No. 1, Jan. 1971, pp. 5–6.

Primary Examiner—Ronald L. Wibert
Assistant Examiner—Ronald J. Stern
Attorney—Carlton Hill, J. Arthur Gross et al.

[57] ABSTRACT

The present invention is directed to an arrangement or system for modulating coherent light beams by utilizing a liquid crystal matrix having a plurality of coacting electrode pairs to apply an electrical field to change the light transmitting state of the portion of the liquid crystal associated with each electrode pair from a non-scattering state to a scattering state. To separate the scattered light from non-scattered light and obtain the intensity modulation, a filtering means for removing the scattered radiation is provided for each of the electrode pairs of the matrix and comprises a focusing element having a mask or partition with a window or aperture which partition is disposed at the focal plane of the element with the window or aperture at the focal point to enable the passing of the focused non-scattered light rays with the filtering of the scattered rays. Preferably, the electrode pairs are provided by forming parallel strips of electrically conductive material on the plates of the matrix with the strips of one plate being arranged at 90° to the strips the other matrix so that a coacting electrode pair is provided at each point at which two strips cross or overlap. The focusing elements can be lenses such as cylindrical lenses, fresnel zone plates or concave mirrors. The windows in the partition can be either substantially circular aperatures such as perforations through either a sheet or foil or slit-like apertures. The focusing elements or lenses are preferably formed in one of the plates of the liquid crystal matrix such as by pressing or embossing. A preferred method of forming the partition for the arrangement is to project light through the focusing elements, such as those embossed into a carrier plate of the matrix, onto a sheet of material having a photosensitive layer which sheet is positioned at the focal plane of the focusing elements to develop the light transmitting windows. If a foil is used as the partition, the intensity of the light radiation being projected through the focusing elements can be of a sufficient magnitude to burn the aperatures into the foil to form the light transmitting windows.

11 Claims, 4 Drawing Figures

LIQUID CRYSTAL MATRIX WITH CONTRAST ENHANCEMENT

BACKGROUND OF THE INVENTION

1. Field of the Invention

The present invention relates to an arrangement or system for a two dimensional spatial and time wise modulation of a bundle of light beams utilizing a liquid crystal and a method of providing the arrangement.

2. Prior Art

In many applications of modern optics for example acoustical holography and micro wave holography, a necessity exists to build a hologram from electrical signals which are derived from a corresponding interference field or pattern. The reconstruction of a hologram requires an electrical optical arrangement or system in which the transmission properties for coherent light can be controlled spacially in two dimension and as a function of time by electrical signals. A similar problem exists in coherent optical data processing wherein incoherent optical data must be modulated on a coherent light wave in a similar manner.

In a liquid crystal cell, a nematic fluid has oblong molecules which are arranged in a preferred direction with the molecules being substantially parallel to provide an optical anisotropy which transmitts light without scattering or in an undispersed condition. If an electrical field is applied to a layer of the nematic fluid, the original ordering or alignment of the molecules is destroyed and the preferential direction is subjected to considerably fluctuation as to space and time and will cause scattering or dispersion of a coherent light beam being projected through the liquid crystal. This effect which leads to the scattering of a coherent light beam projected through a liquid crystal is known as "dynamic scattering".

If a display utilizing a liquid crystal matrix is used for modulating a light beam, points in the matrix adjacent to the electrodes being energized to apply the field are also partially energized by the coupling effect of the field at the point of application. With the liquid crystal utilizing a liquid layer between carrier plates having a plurality of electrode pairs, it is difficult to uncouple the points adjacent to the energized electrode pairs. Thus the scattering in the selected portion of the layer is carried over into adjacent areas which are not selected to be in a dynamic scattering state.

SUMMARY OF THE INVENTION

The present invention provides an arrangement or system for the two dimensional spatial and time wise modulation of a bundle of coherent light beams using a dynamically scattering liquid crystal matrix and a filtering means associated with each portion of the matrix. The liquid crystal matrix is formed by a nematic liquid layer arranged between two transparent carrier plates with a matrix of electrode pairs formed by parallel strips of electrically conductive and transparent material on each of the plates arranged with the strip of one plate at 90° to the strips of other plates to selectively apply an electrical field to different portions of the nematic fluid. The filtering means arranged with each portion comprises a focusing element and a mask partition or diaphragm having a light transmitting window or aperture which partition or mask is located at the focal plane of the focusing element with the window disposed at the focal point to enable the passage of unscattered or undispersed coherent light while the partition or mask prevents the passage of the scattered light to reduce the problem of coupling between points in the fluid layer adjacent to the overlapped, energized electrode strips. The focusing elements are preferably lenses, concave mirrors, cylindrical lens, or fresnel zonal plates. The windows of the diaphragm or mask partition are preferably designed with either a circular aperture or slot aperture having a size order equal to the size of the focal spot of unscattered coherent radiation and may either be perforations through an impervious sheet of material such as metal foil or be a light transmitting window in a non-transparent sheet. To produce the arrangement the focusing elements are preferably formed in one of the plates of the liquid crystal by embossing or impressing and the sheet of material forming the partition is located at the focal plane of the element, then a coherent light is passed through the elements to develop exposed portions on a light sensitive material which portions are developed to form the windows or to burn apertures in a metal foil at the focal points of the focusing elements.

DESCRIPTION OF THE PREFERRED EMBODIMENTS

Figure 1:
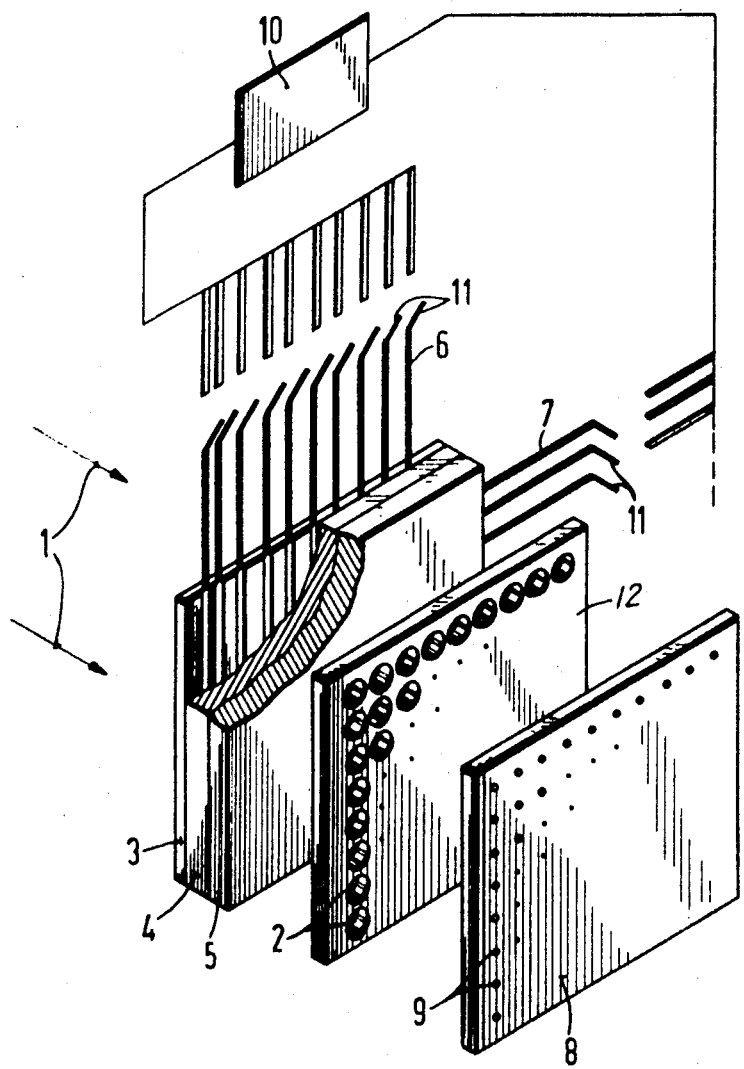
FIG. 1 is an isometric view of an arrangement or apparatus for performing the present invention.

The principles of the present invention are particularly useful for modulating a bundle of coherent light beams 1 (FIG. 1) which preferably originate from a laser. A nematic liquid crystal cell having a nematic fluid layer 4 disposed between two glass panels or transparent carrier plates 3 and 5 is disposed in the path of the bundle of light rays 1. The liquid crystal cell has a plurality of coacting pairs of electrodes for applying a field on discrete portions of the layer 4 to cause a shifting of the light transmitting state from a nonscattering to a scattering state.

Preferably the coacting pairs of electrodes are formed by the coaction of parallel extending strip electrodes 6 on a surface of the carrier plate 3 and parallel extending strip electrodes 7 on a surface of the carrier plate 5 which plates are arranged with the strip electrodes 6 extending at substantially 90° to the strip electrodes 7. Thus a single strip electrode 7 on the panel 5 overlies each of the strip electrodes 6 on the panel 3 and is spaced therefrom by the layer 4 of nematic fluid. To provide the strip electrode with a small spacing between strips, the strip electrodes are preferably formed by coating a surface of each of the panels 3 and 5 with a light transparent, electrically conductive material, masking the coating with the desired pattern and etching the coating to obtain the parallel strips. Each of the electrodes 6 and 7 is provided with a separate external connector for individual connection by switches 11 to an external voltage source 10.

In operation, the energizing of any of the electrodes 6 and any of the electrodes 7 will apply a field to the layer 4 of nematic fluid at the points in which the energized strip 6 overlies energized strips 7. As mentioned above, the field between the two energized strips 6 and 7 is not limited to the portion of the fluid layer disposed therebetween but spreads with decreasing intensity radially outward from the point of overlap of the two energized electrodes. Such a spreading of the application of the field to portions of the liquid layer adjacent to the portion disposed between the two energized electrodes 6 and 7 causes a coupling effect which is undesirable.

To eliminate the undesirable effect of the energized electrodes to the adjacent portion of the layer, a plurality of filtering means are provided for each point of intersection or overlap of electrodes 6 and 7. The filter means includes a focusing element 2 such as a lens coacting with a partition mask or diaphragm 8 located on the focal plane of the focusing elements 2 which partition or mask has a light transmitting area or window 9 at the focal point of each of the focusing elements 2. Thus, the non-scattered light passing through a portion of the layer 4 lying between two electrodes 6 and 7 is focused by the element 2 and passes through the windows 9 in the partition or mask 8. Any scattered light passing through the focusing element 2 will be filtered out by striking the partition or diaphragm 8 since the focusing element is unable to focus the scattered light to the focal point of the element.

Each of the focusing elements will focus a discrete portion of the coherent light passing through a discrete portion of the liquid crystal to pass through the window 9. Light passing through the liquid crystal cell adjacent to a discrete portion associated with the focusing element 2 will not pass through the focusing element to be focused to be passed through the window 9. When the discrete portion associated with a focusing element is in a scattering or dispersing state, the dispersed or scattered rays will not be focused by the element 2 to pass through the window 9 and thus will not go to a screen or intensity detecting means located on the other side of partition or mask 8. When an intersection of the electrode strips 6 and 7 is energized with the coupling effect causing spreading of the field to cause partial scattering at a non-energized adjacent intersection, the focusing element will focus the unscattered rays or portion of the light beam to pass through the window 9, while the scattered rays or portion of the light beam is filtered or separated by striking the partition or mask 8. Thus with the filtering means for each of the overlapped portions or intersections of the electrodes 6 and 7, the arrangement, utilizing the liquid crystal cell, filters the scattered rays so that dynamic scattering can modulate the bundle 1 of coherent light beams with an intensity modulation to produce in a plane extending substantially perpendicular to the direction of propagation of the bundle a large contrast between the portions of the bundle which are scattered and those portions which are passed through the crystal cell in an unscattered state.

As illustrated, the focusing elements 2 of each of the filter means are provided in a separate support 12. However, the focusing elements 2 can also be supported on one of the carrier plates such as 5. A preferred method of providing the focusing elements 2 on the carrier 5 is the embossing of lenses into the transparent panel at the appropriate position with respect to the intersections or overlaps of the electrode 6 and 7.

Figure 2:
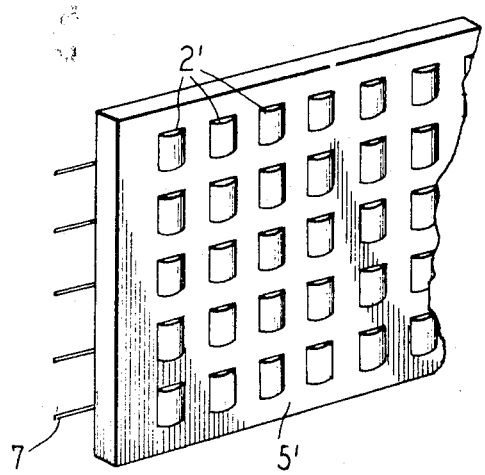
FIG. 2 is a partial isometric view of an embodiment of the focusing elements of the present invention.
Figure 3:
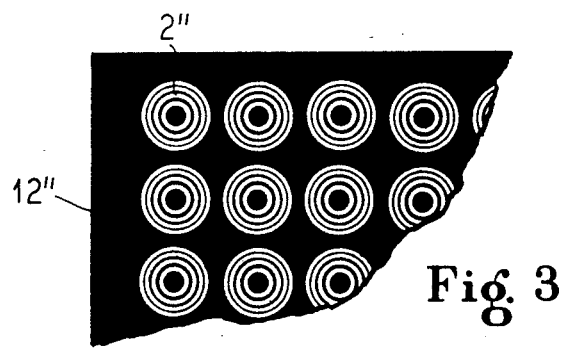
FIG. 3 is a partial isometric view of another embodiment of the focusing element of the present invention.

The lens focusing element 2 may be a cylindrical lens 2' arranged in a matrix on a support such as a plate 5' of the liquid crystal cell (FIG. 2). Instead of a lens, the focusing elements may be a fresnel zone plates 2'' form in a matrix on support 12'' or concave mirrors.

The windows or areas 9 may be perforation in a light impervious sheet such as metal foil forming the partition or mask 8. The diaphragm or mask 8 can be also a sheet of light transparent material having a layer of light sensitive or photosensitive material which layer has been exposed to provide light transmitting windows or portions 9.

One method of forming the partition or mask 8 with the windows 9 is to provide the focusing elements 2 such as lenses on one of the carrier plates such as 5, position the parition 8, which has a photo or light sensitive layer, on the focal plane of the focusing elements 2, then pass a coherent beam of light through the focusing element to expose a portion of the layer at the focal point which during subsequent development provides the light transmitting windows 9. Such a method has the advantage of obtaining proper alignment of the windows 9 with the focusing elements 2 and each of their respective overlaps of the electrodes strips 6 and 7.

A second method is similar to the above mentioned method however the partition 8 is a metal foil or sheet and the windows 9 are perforations therethrough. To form the perforations, a high intensity laser beam of coherent light is projected through the focusing elements 2 to burn or machine the apertures forming the windows 9 into the foil.

Figure 4:
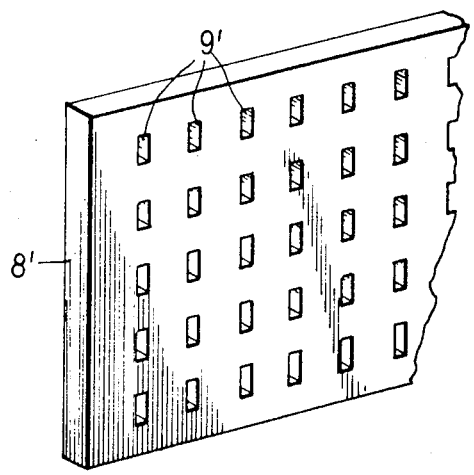
FIG. 4 is a partial isometric view of an embodiment of the mask of the present invention.

The windows 9 have a size substantially the same as the size order of the spot of focused coherent light at the focal point. The windows 9 may have a circular configuration as shown in FIG. 1 or if desired have a slot or slit configuration as indicated as 9' in mask 8' (FIG. 4).

The invention is based on a fundmental realization that with the passing of coherent light through a liquid crystal cell, the coherence of the unscattered light is preserved independently of the field applied. The intensity of the unscattered portion of light is dependant on the amount of light scattered by the field. The co-energizing of points adjacent an intersection of energized electrodes 6 and 7 will have a negligible and low influence on the intensity of the unscattered share of the light beam, dependency is a non linear course, thus the problem of coupling in a display matrix does not occur or is minimized. By separating the scattered portion of light from the unscattered portion by the filtration, an amplitude modulation of the unscattered portion of coherent light is obtained whose amplitude is controlled by the amount of voltage applied to the liquid crystal cell. For spatial modulation, the liquid crystal cell is divided by the matrix shaped electrode structures into elements which can be individually controlled. Thus portions of the liquid crystal cell can be in a scattering state and other portions is a non-scattering state by controlling the electrical field applied at various portions of the liquid crystal matrix to produce a bundle of coherent light having modulation in a plane extending perpendicular to the path of the bundle. By varying the voltage and thus the strength of the field, the amount of scattering can be varied to produce partial intensity modulation in portions of the beam after passing through the filter means.

The present arrangement can be utilized in an optical display, or in production of synthetic holograms produced with the electrical signals derived from an interference field. The arrangement can also be utilized in connection with a television camera or utilized with an incoherent-coherent convertor for coherent-optical data processing of incoherently illuminated objects.

Although various minor modifications might be suggested by those versed in the art, it should be understood that we wish to employ within the scope of the patent warranted hereon all such modifications are reasonably and properly come within the scope of our contribution of the art.

We claim:

1. An arrangement for the two dimensional spatial and time-wise modulation of a bundle of light beams, comprising a nematic liquid crystal cell having the nematic fluid disposed between a pair of transparent plates, said liquid crystal cell having a matrix of electrode pairs formed by electrically conductive layers on each of said plates to selectively apply an electrical field to different portions of the nematic fluid to change the liqht transmitting state from a non-scattering state to a scattering state, and filter means arranged with each of the electrode pairs for separating the scattered light from each of said electrode pairs from the non-scattered light, each of said filter means comprising a focusing element and a mask having a light transmitting area, said mask being disposed on the focal plane of the focusing element with the light transmitting area at the focal point for its respective element, said filter means being arranged in a matrix corresponding to the matrix of electrode pairs formed in the nematic liquid crystal cell.

2. An arrangement according to claim 1, wherein the electrically conductive layers of each plate are parallel strips forming parallel strip electrodes, wherein the plates are arranged with the strip electrodes of one plate being arranged at 90° to the strip electrodes of the other plate of said pair to provide a pair of coacting electrodes at each point at which a strip electrode of one plate overlies a strip electrode of the other plate, and wherein a single filter means is aligned with each of said points.

3. An arrangement according to claim 2, wherein the strip electrodes are arranged to form two dimensional matrix and each of the strip electrodes is individually connected with a voltage source.

4. An arrangement according to claim 1, wherein the focusing elements consist of lenses.

5. An arrangement according to claim 4, wherein the lenses are cylindrical lenses.

6. An arrangement according to claim 1, wherein the focusing elements are Fresnel zone plates.

7. An arrangement according to claim 1, wherein the light transmitting areas of the mask are substantially circular apertures.

8. An arrangement according to claim 1, wherein the light transmitting areas of the mask are substantially slot-like apertures.

9. An arrangement according to claim 1, wherein the light transmitting areas of the mask are dimensioned to have a size order of the size of the area of the focused light beam of non-scattered coherent light at the focal point of the focusing element.

10. An arrangement according to claim 1, wherein the mask for each of the focusing elements comprises a sheet of light transmitting material having a layer of material impervious to light and wherein the light transmitting areas are light passing areas in said layer which are arranged in a matrix corresponding to the matrix of the focusing elements.

11. An arrangement according to claim 1, wherein the focusing element of each of the filter means are supported on an outer surface of one of said plates, and wherein the mask for each of the focusing elements is formed by a single sheet having a plurality of light transmitting apertures with an aperture arranged at each one of the focal points of the focusing elements.

* * * * *